US010863639B2

(12) United States Patent
Schober

(10) Patent No.: US 10,863,639 B2
(45) Date of Patent: Dec. 8, 2020

(54) FREEZE-RESISTANT ACCELEROMETERS

(71) Applicant: Honeywell International Inc., Morris Plains, NJ (US)

(72) Inventor: Christina M. Schober, Saint Anthony, MN (US)

(73) Assignee: Honeywell International Inc., Charlotte, NC (US)

(*) Notice: Subject to any disclaimer, the term of this patent is extended or adjusted under 35 U.S.C. 154(b) by 147 days.

(21) Appl. No.: 16/138,043

(22) Filed: Sep. 21, 2018

(65) Prior Publication Data
US 2020/0100373 A1 Mar. 26, 2020

(51) Int. Cl.
H05K 5/02 (2006.01)
G01P 15/08 (2006.01)
G01P 15/125 (2006.01)

(52) U.S. Cl.
CPC ........ H05K 5/0213 (2013.01); G01P 15/0802 (2013.01); G01P 15/125 (2013.01)

(58) Field of Classification Search
CPC .............. H05K 5/02123; H05K 5/0213; G01P 15/0802; G01P 15/125
USPC ...................................................... 73/514.16
See application file for complete search history.

(56) References Cited

U.S. PATENT DOCUMENTS

| 4,424,677 A * | 1/1984 | Lukasavage | F01K 25/08 415/147 |
|---|---|---|---|
| 5,458,008 A | 10/1995 | Rassatt | |
| 7,128,081 B2 * | 10/2006 | Dourdeville | B01L 3/502738 137/13 |
| 7,230,959 B2 | 6/2007 | Johnson | |
| 7,934,384 B2 * | 5/2011 | Tuskiewicz | A47F 3/0404 62/114 |
| 8,028,438 B2 * | 10/2011 | Pedtke | F24F 13/222 106/222 |
| 8,519,595 B2 * | 8/2013 | Hunter | H01L 37/02 310/305 |
| 8,726,730 B1 * | 5/2014 | Nielson | G01C 19/5733 73/504.01 |
| 8,839,630 B2 | 9/2014 | Nepsha et al. | |
| 2008/0245090 A1 * | 10/2008 | Valle Ocon | B01D 5/0006 62/272 |

(Continued)

OTHER PUBLICATIONS

"What is a Self Basting Cast Iron?" Hunker.com, accessed on Jun. 1, 2018, accessed from https://www.hunker.com/13420229/what-is-a-self-basting-cast-iron, 2 pp.

(Continued)

Primary Examiner — Octavia Hollington
(74) Attorney, Agent, or Firm — Shumaker & Sieffert, P.A.

(57) ABSTRACT

In some examples, the disclosure describes an accelerometer including a proof mass, and a housing enclosing the proof mass. The accelerometer includes a cold temperature sink defining a condensing surface. In some examples, the disclosure describes a technique for making an accelerometer. The example technique includes forming a cold temperature sink defining a condensing surface, and enclosing a proof mass in the housing. The condensing surface is configured to promote at least one of condensation or ice formation in an interior of the housing. The condensing surface is spaced from the proof mass to divert at least one of condensate or ice away from the proof mass.

20 Claims, 4 Drawing Sheets

(56) References Cited

U.S. PATENT DOCUMENTS

2016/0131401 A1* 5/2016 Otanicar ................ F25B 21/02
  62/3.3
2017/0092405 A1   3/2017 Manahan et al.

OTHER PUBLICATIONS

"Zelancio Cookware 6 Quart Cast Iron Enamel Covered Dutch Oven Cooking Dish with Skillet Lid (Cayenne Red)," Amazon.com, accessed on Jun. 1, 2018, accessed from https://www.amazon.com/Zelancio-Cookware-Covered-Self-Basting-Tangerine/dp/B01N3JQ09T?th=1, 13 pp.

* cited by examiner

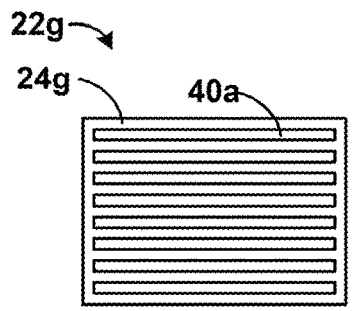
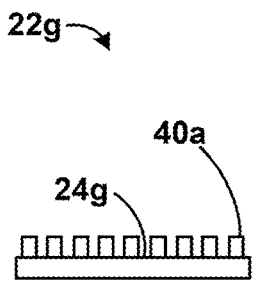
FIG. 6A  FIG. 6B
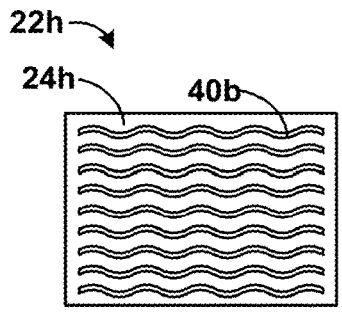
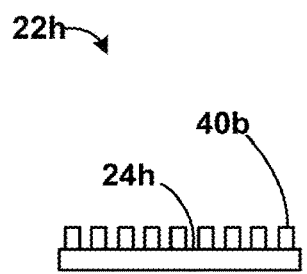
FIG. 7A  FIG. 7B
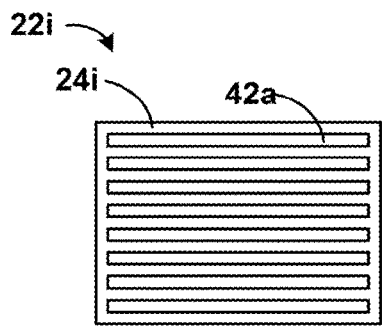
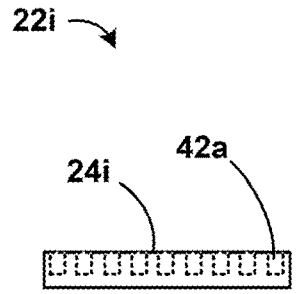
FIG. 8A  FIG. 8B
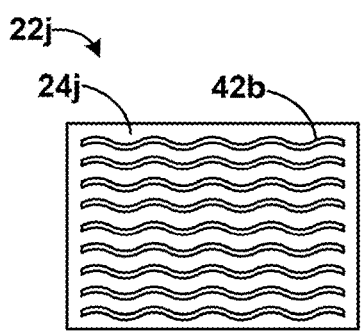
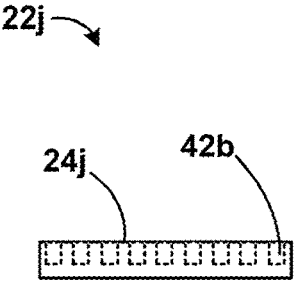
FIG. 9A  FIG. 9B

FREEZE-RESISTANT ACCELEROMETERS

TECHNICAL FIELD

The disclosure relates to accelerometers, in particular, accelerometers having reduced condensation or ice formation on a proof mass.

BACKGROUND

Accelerometers function, for example, by detecting the displacement of a proof mass under inertial forces. An accelerometer assembly may, for example, detect the displacement of a proof mass by a capacitive pick-off system. In this example, a capacitor pick-off plate may be deposited on the upper surface of the proof mass, and a similar capacitor pick-off plate may be deposited on the lower surface of the proof mass. The capacitor plates cooperate with the inwardly facing surfaces of upper and lower stators to provide the capacitive pick-off system. Additionally, a force-rebalancing system may be used to detect the displacement of the proof mass, where coil forms with force-rebalancing coils are mounted on either side of the proof mass. The force-rebalancing coils cooperate with permanent magnets in the upper and lower stators and with a suitable feedback circuit to retain the proof mass at a predetermined position (i.e., a null position) with respect to the support structure. Acceleration applied to the accelerometer assembly may be determined based on the change in capacitance with respect to the capacitor pick-off plates or the current increase in the force-rebalancing coils to maintain the proof mass in the null position.

SUMMARY

In some examples, the disclosure describes accelerometers and techniques for making accelerometers that may exhibit reduced or no condensation or ice formation on or adjacent a proof mass.

In some examples, the disclosure describes an accelerometer. The accelerometer includes a proof mass, and a housing enclosing the proof mass. The accelerometer includes a cold temperature sink defining a condensing surface. The condensing surface is configured to promote at least one of condensation or ice formation in an interior of the housing. The condensing surface is spaced from the proof mass to divert at least one of condensate or ice away from the proof mass.

In some examples, the disclosure describes a technique for making an accelerometer. The technique includes forming a cold temperature sink defining a condensing surface. The condensing surface is configured to promote at least one of condensation or ice formation in an interior of the housing. The technique includes enclosing a proof mass in the housing. The condensing surface is spaced from the proof mass to divert at least one of condensate or ice away from the proof mass.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 6A is a conceptual diagram illustrating a top-view of an example cold temperature sink defining a condensing surface defining fins.

FIG. 6B is a conceptual diagram illustrating a side-view of the cold temperature sink of FIG. 6A.

FIG. 7A is a conceptual diagram illustrating a top-view of an example cold temperature sink defining a condensing surface defining undulating fins.

FIG. 7B is a conceptual diagram illustrating a side-view of the cold temperature sink of FIG. 7A.

FIG. 8A is a conceptual diagram illustrating a top-view of an example cold temperature sink defining a condensing surface defining channels.

FIG. 8B is a conceptual diagram illustrating a side-view of the cold temperature sink of FIG. 8A.

FIG. 9A is a conceptual diagram illustrating a top-view of an example cold temperature sink defining a condensing surface defining undulating channels.

FIG. 9B is a conceptual diagram illustrating a side-view of the cold temperature sink of FIG. 9A.

DETAILED DESCRIPTION

In some examples, the present disclosure describes accelerometer devices and methods for making accelerometer devices that divert moisture or ice formation from a proof mass of an accelerometer. An accelerometer includes a proof mass (also known as a pendulous mass or a pendulum) that moves in response to acceleration. The accelerometer may include circuitry for sensing the motion of the proof mass, which is indicative of the acceleration. Moisture in a housing of the accelerometer may condense as a liquid or as ice on or near the proof mass, which may limit the free motion of the proof mass and ultimately affect performance or sensitivity of the accelerometer. Techniques including as vacuum baking and sealing may reduce introduction of moisture in the housing. However, moisture may enter the housing as the accelerometer is exposed to increasing humidity during operation, or as a result of inadequate bake or inadequate seal. For example, an accelerometer may not have a hermetic seal, or sealing elements in the accelerometer (such as o-rings) may admit some moisture into the housing.

Example accelerometers according to the disclosure may exhibit reduced or no condensation or ice formation on or adjacent a proof mass. In some examples, an accelerometer includes a proof mass, and a housing enclosing the proof mass. The accelerometer includes a cold temperature sink defining a condensing surface. The condensing surface is configured to promote at least one of condensation or ice formation in an interior of the housing. The condensing surface is spaced from the proof mass to divert at least one of condensate or ice away from the proof mass.

Condensation or ice formation on or adjacent a proof mass may impede the free movement of the proof mass, e.g., during operation of the accelerometer. Diverting moisture, condensate, or ice away from the proof mass or an adjacent structure may reduce or prevent condensation or ice formation on or adjacent the proof mass. In some such examples, the cold temperature sink may act as a passive system and may not need moving, powered parts or components to divert the moisture/ice to deposit in another non-impeding area or region of the housing. Thus, problems associated with moisture that may inadvertently be introduced into the housing during or after manufacture of the accelerometer may be reduced or eliminated.

In some examples, a thermal map of the accelerometer may be prepared, for example, using finite element analysis or other appropriate techniques, to identify a non-impeding area or region where formation of moisture or ice may not impede the proof mass. The cold temperature sink may be formed in such a non-impeding area or region.

Figure 1A:
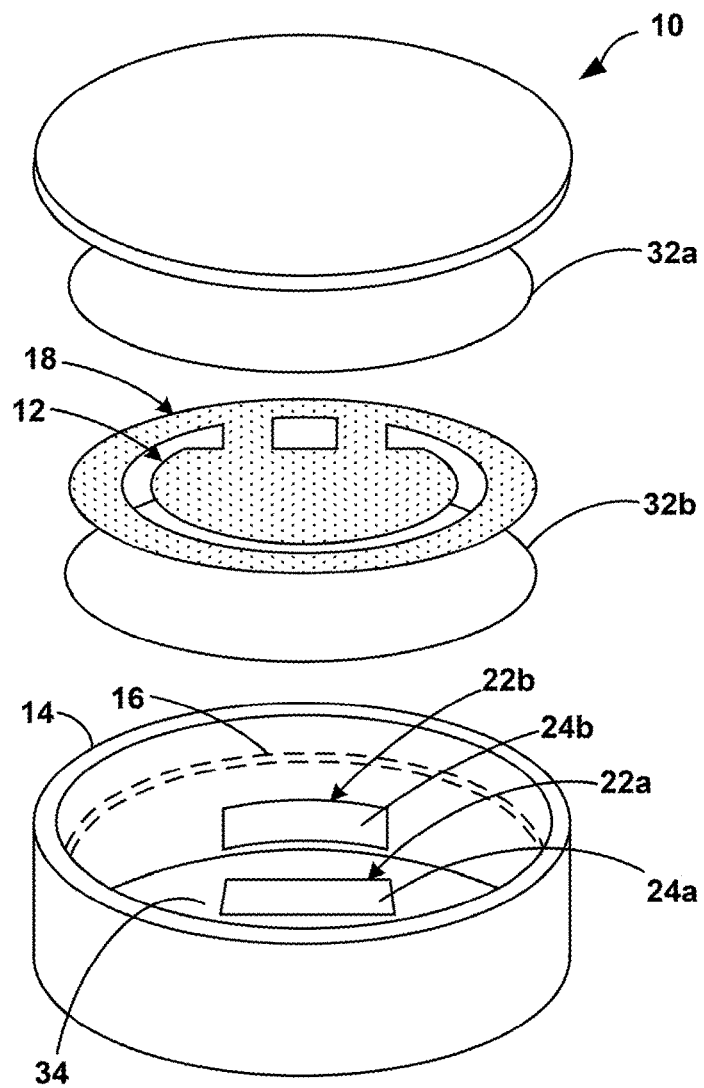
FIG. 1A is a conceptual diagram illustrating an exploded view of an example accelerometer.
Figure 1B:
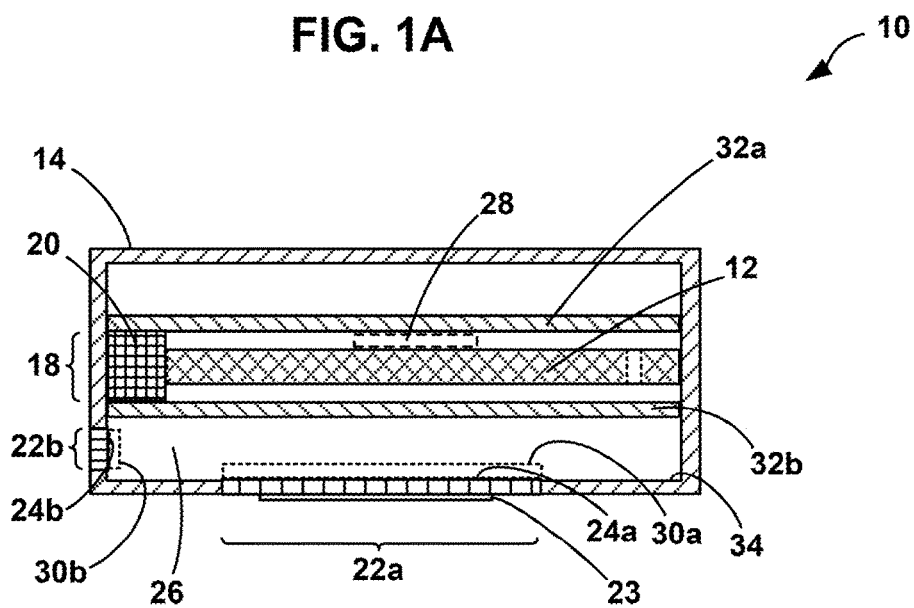
FIG. 1B is a conceptual diagram illustrating a cross-sectional view of the accelerometer of FIG. 1A.

FIG. 1A is a conceptual diagram illustrating an exploded view of an example accelerometer 10. FIG. 1B is a conceptual diagram illustrating a cross-sectional view of accelerometer 10 of FIG. 1A. Accelerometer 10 includes a proof mass 12, and a housing 14 enclosing proof mass 12. Proof mass 12 may one or more of exhibit a change in position, move, or oscillate in response to acceleration. Accelerometer 10 may include circuitry that senses or detects such a change, and that generates a signal indicative of the acceleration. Proof mass 12 may include an in-plane proof mass or an out-of-plane proof mass.

Proof mass 12 may be secured, coupled to, or mounted to housing 14 at a location 16 defined by housing 14. In some examples, proof mass 12 may be secured to housing 14 about a periphery of proof mass 12, and location 16 may extend about a periphery of housing 14. In other examples, location 16 may not extend about the periphery, and proof mass 12 may only be secured, coupled to, or mounted at one or more predetermined areas or regions of housing 14.

In some examples, accelerometer 10 includes a proof mass assembly 18 including proof mass 12. In addition, proof mass assembly 18 may include a proof support 20. Proof support 20 may couple or secure proof mass 12 to proof mass assembly 18, while allowing proof mass 12 to move in response to acceleration. While proof support 20 may be distinct or separate from proof mass 12, in other examples, proof support 20 may be defined by an extension of proof mass 12 or of a component of proof assembly 18. In some examples, proof mass assembly 18 is monolithic. For example, one or more of proof mass 12, proof support 20, or other components of proof mass assembly 18 may be unitary or integrated in a single continuous component. In other examples, one or more components of proof mass assembly 18 may be monolithic or unitary, while one or more other components may be discrete. In some examples, proof mass assembly 18 includes at least one of a piezoelectric material or a silicon-based material. For example, one or more components of proof mass assembly 18, or the entirety of proof mass assembly 18, may be formed of a piezoelectric material or a silicon-based material.

Accelerometer 10 includes a cold temperature sink 22a defining a condensing surface 24a. Condensing surface 24a is configured to promote at least one of condensation or ice formation in an interior 26 of housing 14. In some examples, condensing surface 24a may define a region of an interior surface of housing 14, for example, facing interior 26. In some examples, condensing surface 24a may be flush with or smoothly continuous with a surface of housing 14. In some examples, condensing surface 24a may be raised or offset from an adjacent surface of housing 14, or may be depressed relative to an adjacent surface of housing 14. In other examples, condensing surface 24a may be spaced from an interior surface of housing 14. In some examples, condensing surface 24a may be defined by a component enclosed in housing 14. In the absence of a cold temperature sink or a condensing surface, condensate or ice may form in a volume 28 adjacent proof mass 12, for example, in contact with a major surface of proof mass 12. Such condensate or ice in volume 28 may interfere with or impede movement or oscillation of proof mass 12, and may affect the sensitivity or accuracy of accelerometer 10 in detecting acceleration. As shown in FIGS. 1A and 1B, condensing surface 24a is separate and spaced from proof mass 12 to divert at least one of condensate or ice away from proof mass 12. In this way, the at least one of condensate or ice 30a is at least partially formed at condensing surface 24a instead of in or near volume 28.

In some examples, condensing surface 24a is configured to retain condensate or ice 30a. For example, after condensate or ice is formed on condensing surface 24a, substantially all of the condensate or ice formed on condensing surface 24a may be retained on (for example, in contact with) condensing surface 24a. Thus, the condensate or ice may be prevented from contacting proof mass 12 or otherwise entering a volume or region in which proof mass 12 may extend or move into. Condensing surface 24a may be sufficiently spaced from proof mass 12 (or proof mass assembly 18) so that condensate or ice formed, captured, or retained on condensing surface 24a does not impede with free motion of proof mass 12. For example, proof mass 12 may be configured to move within a predetermined volume or region in response to acceleration, and condensing surface 24a may be spaced away from the predetermined volume or region within which proof mass 12 may move or otherwise extend into during movement. In this and similar ways, cold temperature sink 22a may reduce or prevent condensation or ice formation in volume 28 or elsewhere in a vicinity of proof mass 12, and thus improve the sensitivity or accuracy of accelerometer 10 even when subjected to changes in moisture and temperature.

In some examples, accelerometer 10 further includes a structure 32a adjacent the proof mass. For example, structure 32a may include one or more of a damping plate, an excitation ring, a stator, a magnetic assembly, a capacitance plate, a force-rebalance coil, a tuning fork, or circuitry. In some such examples, condensing surface 24a is configured to divert condensate or ice 30a away from volume 28 at least partially defined between proof mass 12 and structure 32a. As shown in FIGS. 1A and 1B, accelerometer 10 may include more than one structure, for example, a second structure 32b, or additional structures. Second structure 32b or additional structures may be identical or similar to structure 32a, or may be structures differing in one or more of size, shape, geometry, or orientation from structure 32a. In some examples, proof mass assembly 18 may include or define one or more of structure 32a, structure 32b, or other structures. Thus, condensing surface 24a may be configured to divert condensate or ice 30a away from one or more volumes (for example, volume 28 or the like) adjacent or defined between proof mass 12 and any structures such as 32a, 32b, or the like.

Condensing surface 24a may promote condensation or ice formation by exhibiting a relatively higher thermal conductivity relative to other regions or components of accelerometer 10. For example, if an environment of accelerometer 10 is colder than interior 26 of housing 14, the higher thermal conductivity of condensing surface 24a may promote heat transfer away from housing 14 at condensing cold temperature sink 22a, which may in turn promote condensation or ice formation at condensing surface 24a. For example, condensing surface 24a may include a first region (for example, a portion or an entirety of condensing surface 24a) having a first thermal conductivity that is greater than a second thermal conductivity of a second region 34 defined by housing 14 or accelerometer 10. The first region conducts heat away from housing 14 faster than second region 34 to promote condensation or ice formation and retain condensate or ice 30a at the first region. For example, the rate of condensation or ice formation may be higher at the first region of condensing surface 24a relative to second region 34, so that a more condensate or ice is preferentially formed at condensing surface 24a relative to that at second region 34. While second region 34 may be defined by housing 14, in other examples, second region 34 may be defined by other components or structures of accelerometer 10. For example, second region 34 may be defined by proof mass 12, so that ultimately, more condensate or ice is preferentially formed at condensing surface 24a relative to that at proof mass 12.

In some examples, condensing surface 24a includes a region having a highest thermal conductivity within housing 14 to conduct away heat from housing 14 to promote at least one of condensation or ice formation and retain condensate or ice 30a at the region. For example, condensing surface 24a may have a higher thermal conductivity compared to any other region on or defined by housing 14. In some examples, accelerometer may include an external cooling feature 23 thermally coupled to a condensing surface, for example, to condensing surface 24a, as described elsewhere in the disclosure.

In some examples, accelerometer 10 may include more than one cold temperature sink 22a and condensing surface 24a. For example, as shown in FIGS. 1A and 1B, accelerometer 10 may include a second cold temperature sink 22b and a second condensing surface 24b to retain condensate or ice 30b, or more cold temperature sinks and condensing surfaces. The different cold temperature sinks may be shaped, oriented, and dimensioned similar to each other, or different from each other. For example, as shown in FIGS. 1A and 1B, first cold temperature sink 22a is at a bottom of accelerometer 10, while second cold temperature sink 22b is at a side of accelerometer 10. However, any appropriate positioning may be used to divert condensate or ice to different regions of housing 14 away from proof mass 12 or from proof mass assembly 18. In some examples, multiple condensing surfaces (for example, condensing surfaces 24a and 24b) may have identical highest thermal conductivities. In other examples, different condensing surfaces may have different thermal conductivities, each respective conductivity being higher than the thermal conductivity of other regions of housing 14. Thus, one or more condensing surfaces may cause condensate or ice to be diverted from volume 28 and away from proof mass 12 or proof mass assembly 14.

Condensing surface 24a, 24b, or other condensing surfaces may be defined by a composition including a metal, a metalloid, an alloy, or any suitable thermally conductive material. The metal, metalloid, or alloy may include one or more of the following in elemental form, in a compound, or in an alloy component: copper, iron, nickel, aluminum, carbon, or silicon. In some examples, the thermally conductive material may include, for example, graphene, diamond, diamond-like carbon, graphite, or combinations thereof. The composition of proof mass 12 or of proof mass assembly 18 may be different from that of condensing surface 24a, 24b, or other condensing surfaces. For example, such a difference in composition may cause condensing surface 24a, 24b, or other condensing surfaces to exhibit a higher thermal conductivity or otherwise exhibit a temperature differential relative to other components of accelerometer 10, to ultimately cause preferential or selective condensation or ice formation at the condensing surface(s). In some examples, condensing surface 24a, 24b, or other condensing surfaces may at least partially define an exposed metal or alloy surface. In some examples, condensing surface 24a, 24b, or other condensing surfaces may define a smooth or relatively smooth surface, for example, a planar or curved surface.

In some examples, condensing surface 24a, 24b, or other condensing surfaces may define at least one of a plurality of condensing features configured to promote at least one of condensation or ice formation and retain condensate or ice 30a. For example, the plurality of condensing structures comprises at least one of raised features, depressed features, grooves, channels, or interconnected pores. In some examples, at least a portion of the plurality of condensing structures defines a metal or alloy surface. For example, a top of a raised feature, or a bottom of a depressed feature, or any suitable surface of a condensing feature, may define a metal or alloy surface. Some examples of condensing features are described with reference to FIGS. 2A through 9B.

Figure 2A:
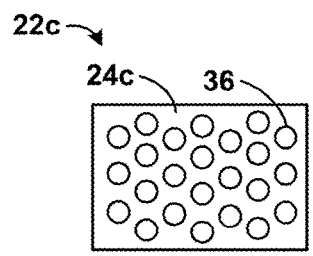
FIG. 2A is a conceptual diagram illustrating a top-view of an example cold temperature sink defining a condensing surface defining raised features.
Figure 2B:
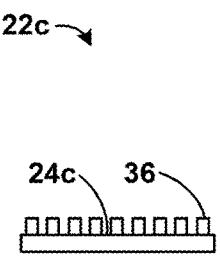
FIG. 2B is a conceptual diagram illustrating a side-view of the cold temperature sink of FIG. 2A.

FIG. 2A is a conceptual diagram illustrating a top-view of an example cold temperature sink 22c defining a condensing surface 24c defining raised features 36. FIG. 2B is a conceptual diagram illustrating a side-view of cold temperature sink 22c of FIG. 2A. In some examples, the condensing features include raised features 36. In some examples, raised features 36 are monolithic or unitary with the rest of cold temperature sink 22c. For example, cold temperature sink 22c may define one or more of projections, protrusions, pedestals, columns extending from condensing surface 24c. In some examples, raised features 36 may be deposited on condensing surface 24c, and may include material different from condensing surface 24c or the rest of cold temperature sink 22c. In some examples, raised features 36 include one or more of silicon-based material, piezoelectric material, metal, or alloy. In some examples, a portion of at least one raised feature of raised features 36 may include an exposed metal or alloy surface. For example, a topmost region of a raised feature relative to condensing surface 24c may define an exposed metal or alloy surface. In some examples, raised features 36 have substantially the same thermal conductivity as the rest of cold temperature sink 22c.

Raised features 36 may define a symmetric or asymmetric contour in a plane transverse to a direction normal or perpendicular relative to condensing surface 24c. The contour may be polygonal, curved, or a combination of convex or concave polygonal or curved segments. For example, the contour may include triangular, square, rectangular, n-sided polygonal where n>=3, circular, ellipsoidal, sinusoidal, or any suitable shapes.

Raised features 36 may be separated by interspacing configured to accumulate or retain condensate or ice. For example, the interspacing may be sufficiently large to allow moisture or ice to enter or form between raised features 36. In some examples, the interspacing between raised features 36 may exhibit capillary effects, and cause condensate to be drawn into the interspacing between raised features 36.

Raised features 36 may be substantially uniform, and each raised feature of raised features 36 may have substantially the same height, width, and breadth. In other examples, raised features 36 may include features having different heights, widths, and breadths. In this way, condensing features may include raised features 36 that may promote one or more of formation, capture, or retention of condensate or ice at cold temperature sunk 22c, and divert condensate or ice from volume 28 near proof mass 12.

Figure 3A:
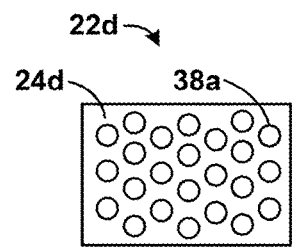
FIG. 3A is a conceptual diagram illustrating a top-view of an example cold temperature sink defining a condensing surface defining depressed features.
Figure 3B:
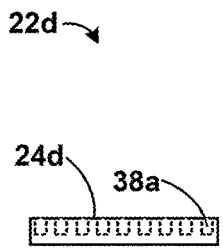
FIG. 3B is a conceptual diagram illustrating a side-view of the cold temperature sink of FIG. 3A.

FIG. 3A is a conceptual diagram illustrating a top-view of an example cold temperature sink 22d defining a condensing surface 24d defining depressed features 38a. FIG. 3B is a conceptual diagram illustrating a side-view of cold temperature sink 22d of FIG. 3A. In some examples, the condensing features include depressed features 38a. Depressed features 38a may be defined by a bulk, body, or matrix of cold temperature sink 22d, or may be defined by a layer deposited on cold temperature sink 22d, for example, a condensing surface 24d. For example, cold temperature sink 22d may define one or more of pits, pores, holes, or openings extending away from condensing surface 24d. In some examples, a portion of at least one depressed feature of depressed features 38a may include an exposed metal or alloy surface. For example, a bottommost region or a sidewall of a depressed feature relative to condensing surface 24d, may define an exposed metal or alloy surface. In some examples, depressed features 38a have substantially the same thermal conductivity as the rest of cold temperature sink 22d.

One or more depressed features 38a may define a symmetric or asymmetric contour in a plane transverse to a direction normal or perpendicular relative to condensing surface 24d. The contour may be polygonal, curved, or a combination of convex or concave polygonal or curved segments. For example, the contour may include triangular, square, rectangular, n-sided polygonal where n>=3, circular, ellipsoidal, sinusoidal, or any suitable shapes.

Depressed features 38a may be separated by any suitable interspacing, and may be configured to accumulate or retain condensate or ice. For example, the depressed features 38a may define openings sufficiently large to allow moisture or ice to enter or form in depressed features 38a. In some examples, depressed features 38a may exhibit capillary effects, and cause condensate to be drawn into depressed features 38a.

Depressed features 38a may be substantially uniform, and each depressed feature of depressed features 38a may have substantially the same depth, width, and breadth. In other examples, depressed features 38a may include features having different depths, widths, and breadths. In this way, condensing features may include depressed features 38a that may promote one or more of formation, capture, or retention of condensate or ice at cold temperature sunk 22d, and divert condensate or ice from volume 28 near proof mass 12.

While raised features 36 and depressed features are separately illustrated in FIGS. 2A through 3B, in some examples, a cold temperature sink may include both raised features and depressed features, for example, both raised features 36 and depressed features 38a. In some such examples, raised features 36 and depressed features 38a may be interspersed. In other such examples, a cold temperature sink may include raised features 36 or the like in on region and depressed features 38a or the like in another region.

Figure 4A:
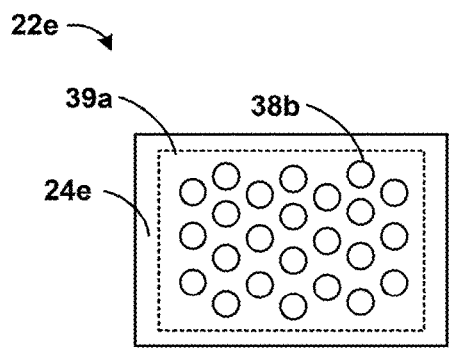
FIG. 4A is a conceptual diagram illustrating a top-view of an example cold temperature sink defining a condensing surface defining pores and a reservoir.
Figure 4B:
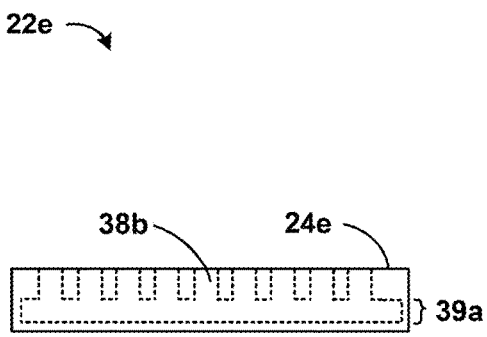
FIG. 4B is a conceptual diagram illustrating a side-view of the cold temperature sink of FIG. 4A.

FIG. 4A is a conceptual diagram illustrating a top-view of an example cold temperature sink 22e defining a condensing surface 24e defining pores 38b and a reservoir 39a. FIG. 4B is a conceptual diagram illustrating a side-view of cold temperature sink 22e of FIG. 4A. Pores 38b may be similar to depressed features 38a described with reference to FIGS. 3A and 3B. However, pores 38b are fluidically connected to at least one reservoir, for example, reservoir 39a. Reservoir 39a may be configured to accumulate or retain condensate or ice, for example, drawn or captured through pores 38b.

Figure 5A:
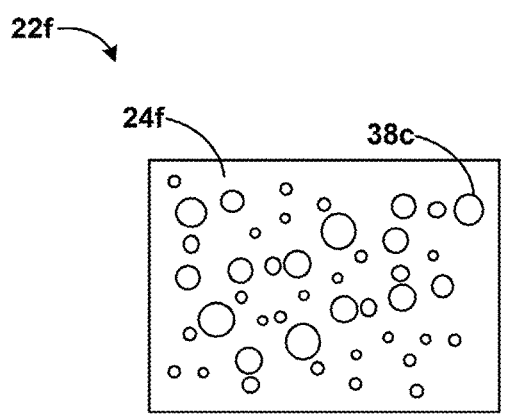
FIG. 5A is a conceptual diagram illustrating a top-view of an example cold temperature sink defining a condensing surface defining a plurality of interconnected pores.
Figure 5B:
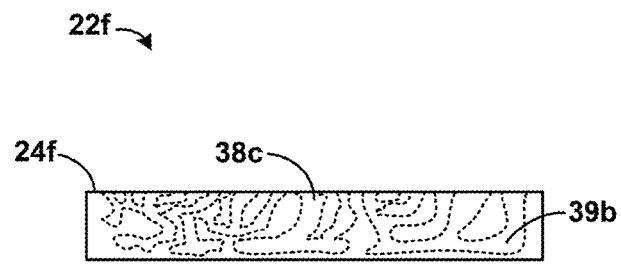
FIG. 5B is a conceptual diagram illustrating a side-view of the cold temperature sink of FIG. 5A.

FIG. 5A is a conceptual diagram illustrating a top-view of an example cold temperature sink 22f defining a condensing surface 24f defining a plurality of interconnected pores 38c. FIG. 5B is a conceptual diagram illustrating a side-view of cold temperature sink 22f of FIG. 5A. Interconnected pores 38c may be similar to depressed features 38a described with reference to FIGS. 3A and 3B. However, in some examples, interconnected pores 38c may not be uniform in size, shape, or opening area, as shown in FIGS. 5A and 5B. At least some pores of pores 38c may be fluidically interconnected, for example, via reservoir 39b.

In some examples, pores 38b or 38c may be fluidically interconnected via a single reservoir, for example, reservoir 39a or 39b. In other examples, pores 38b or 38c may be fluidically interconnected via multiple reservoirs. For example, a first plurality of pores of pores 38b or 38c may be fluidically interconnected to a first reservoir, and a second plurality of pores of pores 38b or 38c may be fluidically interconnected to a second reservoir, and the like. Thus, cold temperature sinks 22e or 22f may include one, two, or more reservoirs fluidically connected to one or more of pores 38b or 38c.

FIG. 6A is a conceptual diagram illustrating a top-view of an example cold temperature sink 22g defining a condensing surface 24g defining fins 40a. FIG. 6B is a conceptual diagram illustrating a side-view of cold temperature sink 22g of FIG. 6A. Fins 40a may be raised relative to condensing surface 24g. In some examples, fins 40a may extend substantially continuously and parallel along a length of condensing surface 24g. In other examples, fins 40a may include holes, openings, or raised or depressed features configured to promote moisture or ice formation, capture, or retention. Fins 40a may be defined by a material that is the same or similar to one or both of condensing surface 24g or of cold temperature sink 22g. In other examples, fins 40a may be defined by a material different from that of condensing surface 24g or of cold temperature sink 22g. Fins 40a may be defined by one or more of metal, alloy, silicon-based material, piezoelectric material, or the like.

FIG. 7A is a conceptual diagram illustrating a top-view of an example cold temperature sink 22h defining a condensing surface 22h defining undulating fins 40b. FIG. 7B is a conceptual diagram illustrating a side-view of cold temperature sink 22h of FIG. 7A. Fins 40b may be the same as or substantially similar to fins 40a described with reference to FIGS. 6A and 6B, and further define an undulating surface (for example, sinusoidal or otherwise alternating along a length of condensing surface 22h).

Fins 40a or 40b may be separated by any suitable interspacing, and may be configured to accumulate or retain condensate or ice. For example, the interspacing may be sufficiently large to allow moisture or ice to enter or form between raised fins 40*a* or 40*b*. In some examples, the interspacing between fins 40*a* or 40*b* may exhibit capillary effects, and cause condensate to be drawn into the interspacing between fins 40*a* or 40*b*.

Fins 40*a* or 40*b* may be substantially uniform, and each raised fins of fins 40*a* or 40*b* may have substantially the same height, width, and breadth. In other examples, fins 40*a* or 40*b* may include features having different heights, widths, and breadths. In this way, the condensing features may include at least one of fins 40*a* or 40*b* that may promote one or more of formation, capture, or retention of condensate or ice at cold temperature sink 22*g* or 22*h*, and divert condensate or ice from volume 28 near proof mass 12.

FIG. 8A is a conceptual diagram illustrating a top-view of an example cold temperature sink 22*i* defining a condensing surface 24*i* defining channels 42*a*. FIG. 8B is a conceptual diagram illustrating a side-view of cold temperature sink 22*i* of FIG. 8A. Channels 42*a* may be defined by a bulk, body, or matrix of cold temperature sink 22*i*, or may be defined by a layer deposited on cold temperature sink 22*i*, for example, on condensing surface 24*i*. For example, cold temperature sink 22*i* may define one or more channels extending away from condensing surface 24*i* and along a length of condensing surface 24*i*. In some examples, a portion of at least one channel of channels 24*i* may include an exposed metal or alloy surface. For example, a bottommost region or a sidewall of a channel relative to condensing surface 24*i*, may define an exposed metal or alloy surface. In some examples, channels 40*a* have substantially the same thermal conductivity as the rest of cold temperature sink 22*i*.

FIG. 9A is a conceptual diagram illustrating a top-view of an example cold temperature sink 22*j* defining a condensing surface 24*j* defining undulating channels 42*b*. FIG. 9B is a conceptual diagram illustrating a side-view of cold temperature sink 22*j* of FIG. 9A. Channels 42*b* may be the same as or substantially similar to channels 42*a* described with reference to FIGS. 8A and 8B, and further define an undulating surface (for example, sinusoidal or otherwise alternating along a length of condensing surface 22*j*).

One or more of channels 40*a* or 40*b* may define a symmetric or asymmetric contour in a plane transverse to a direction normal or perpendicular relative to condensing surface 24*i* or 24*j*. The contour may be polygonal, curved, or a combination of convex or concave polygonal or curved segments. For example, the contour may include triangular, square, rectangular, n-sided polygonal where n>=3, circular, ellipsoidal, sinusoidal, or any suitable shapes, and that may define an opening at or near condensing surface 24*i* or 24*j* and along a length of condensing surface 24*i* or 24*j*.

Channels 42*a* or 42*b* may be separated by any suitable interspacing, and may be configured to accumulate or retain condensate or ice. For example, channels 42*a* or 42*b* may define openings sufficiently large to allow moisture or ice to enter or form in channels 42*a* or 42*b*. In some examples, channels 42*a* or 42*b* exhibit capillary effects, and cause condensate to be drawn into channels 42*a* or 42*b*.

Channels 42*a* or 42*b* may be substantially uniform, and each channel of channels 42*a* or 42*b* may have substantially the same depth, width, and breadth. In other examples, channels 42*a* or 42*b* may include features having different depths, widths, and breadths. In this way, condensing features may include channels 42*a* or 42*b* that may promote one or more of formation, capture, or retention of condensate or ice at cold temperature sunk 22*i* or 22*j*, and divert condensate or ice from volume 28 near proof mass 12.

In some examples, channels 42*a* or 42*b* may be fluidically interconnected to one or more reservoirs, similar to reservoirs 39*a* or 39*b*.

While fins 40*a* and 40*b*, and channels 42*a* and 42*b* are separately illustrated in FIGS. 6A through 9B, in some examples, a cold temperature sink may include both fins and channels, for example, both fins 40*a* or 40*b* and channels 42*a* or 42*b*. In some such examples, fins 40*a* or 40*b* and channels 42*a* or 42*b* may be interspersed. In other such examples, a cold temperature sink may include fins 40*a* or 40*b* or the like in on region and channels 42*a* or 42*b* or the like in another region.

While condensing surfaces, raised features, depressed features, pores, fins, and channels are separately described with reference to cold temperature sinks described with reference to FIGS. 1A through 9B, example cold temperature sinks may include any suitable combinations of condensing surfaces, raised features, depressed features, pores, fins, and channels. Similarly, example housings may include more than one cold temperature sinks, including any suitable combination of cold temperature sinks described by the disclosure. Thus, example cold temperature sinks according to the disclosure may divert condensate or ice from a proof mass, and may reduce or prevent condensate or ice formation at or near a proof mass.

While example raised features, depressed features, pores, fins, and channels are described with reference to condensing surfaces facing an interior of housing 14, example cold temperature sinks may also exhibit or define one or more of raised features, depressed features, pores, fins, or channels on an exterior or facing outwardly from housing 14. For example, one or more cold temperature sinks may define, instead of, or in addition to, features facing interior of housing 14, features facing an exterior of housing 14 or features defined by an exterior surface of housing 14. In some examples, accelerometer 10 may include external cooling feature 23, as shown in FIG. 1B. External cooling feature 23 may include one or more of example raised features, depressed features, pores, fins, and channels described with reference to FIGS. 2A to 9B, and is thermally coupled to at least one condensing surface, so that heat flows from an interior of housing 14, through the at least one condensing surface, through external cooling feature 23, and to an exterior of housing 14. In some such examples, external cooling feature 23 may promote dissipation of heat from an interior of housing 14 to an exterior of housing 14 to cause cooling of the at least one condensing surface thermally coupled to external cooling feature, such that condensation or ice formation is promoted at respective condensing surfaces thermally coupled to the exterior raised features, depressed features, pores, fins, or channels.

Figure 10:
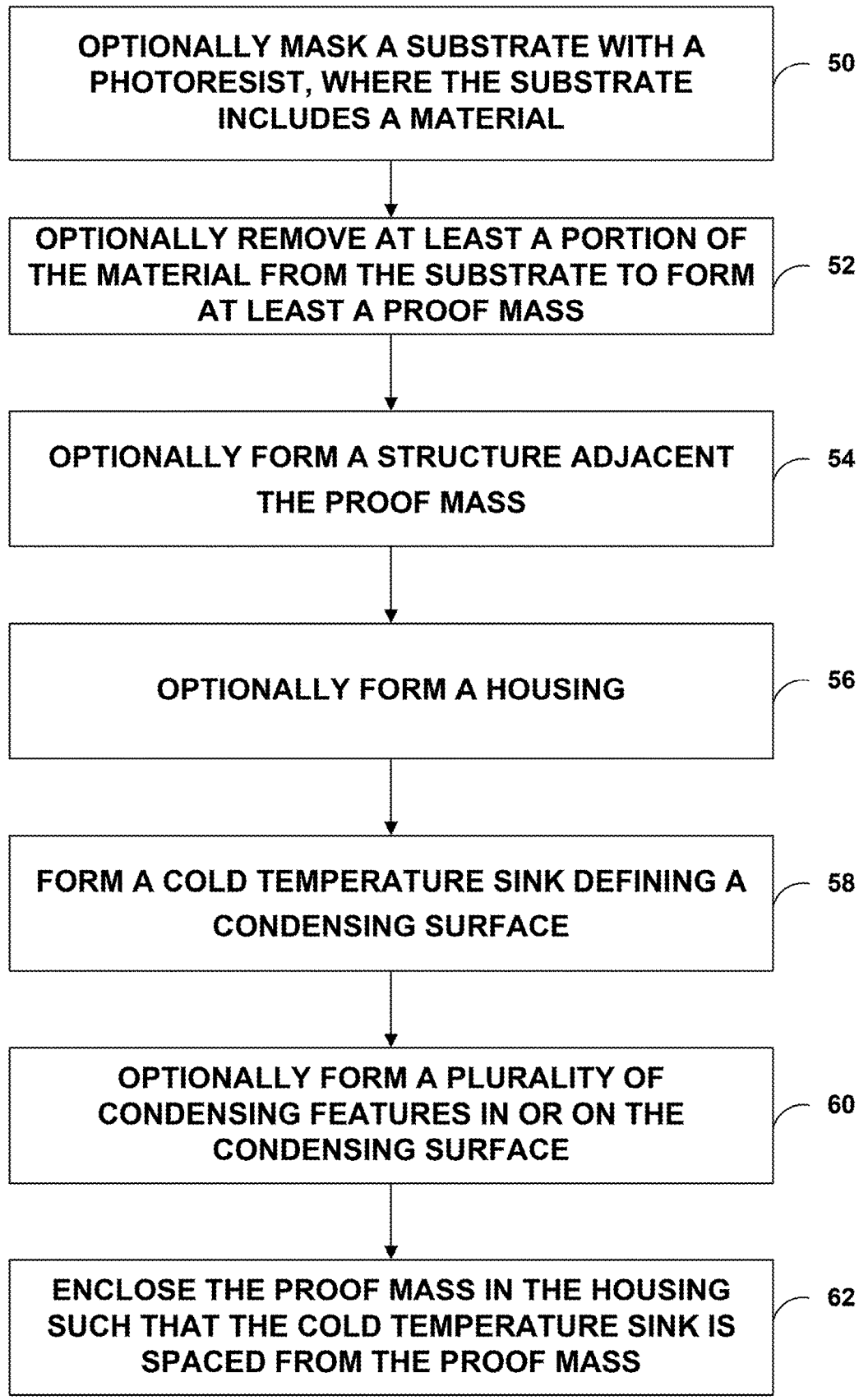
FIG. 10 is a flow chart illustrating an example technique for making an accelerometer in accordance with the disclosure.

FIG. 10 is a flow chart illustrating an example technique for making an accelerometer in accordance with the disclosure. While the example technique of FIG. 10 is described with reference to accelerometer 10 of FIGS. 1A and 1B, the example technique of FIG. 10 may be used to prepare any accelerometer including any cold temperature sink or condensing surface according to the disclosure.

In some examples, the example technique optionally includes fabricating a proof mass. For example, the example technique of FIG. 10 may include optionally masking a substrate with a photoresist (50). The substrate includes a material. For example, the substrate may include a dielectric, or any other suitable material. In some such techniques, the example technique further includes optionally removing at least a portion of the material from the substrate to form a proof mass, for example, proof mass 12 (52). In some examples, forming proof mass 12 may include forming proof mass assembly 13.

In some examples, the example technique of FIG. 10 optionally includes forming structure 32a or 32b adjacent a proof mass 12 (54). The forming 54 may include techniques similar to those used to form proof mass 12, for example, lithography, or the like. In some examples, proof mass assembly 13 including proof mass 12 and structure 32a or 32b may be fabricated in a single technique or step.

In some examples, the example technique of FIG. 10 optionally includes forming housing 14 (56). The forming housing 14 (56) may include one or more of molding, stamping, pressing, routing, machining, or additive manufacturing, or the like.

The example technique of FIG. 10 includes forming cold temperature sink 22a defining condensing surface 24a in housing 14 (58).

In some examples, the example technique optionally includes forming at least one of a plurality of condensing features (for example, one or more of raised features, depressed features, pores, fins, or channels) in condensing surface 24a (60).

The example technique includes enclosing proof mass 12 in housing 14 (62). For example, the enclosing (62) may include coupling, securing, or mounting proof mass 12 to a region of housing 14, or a component of housing 14. Proof mass 12 is enclosed in housing 14 such that cold temperature sink 22a is spaced from proof mass 12.

While example techniques according to the disclosure may be used to fabricate accelerometers, the example techniques may also be used to fabricate any devices including a gap, space, volume, or region adjacent a component or between two components from which condensate or ice is to be diverted. For example, an example device may include any device including at least one component and a cold temperature sink spaced from the component. The cold temperature sink may define a condensing surface, and may include one or more condensing features according to the disclosure. Thus, the cold temperature sink may cause condensate or ice to be formed, captured, or retained away from the component, so that condensate or ice formation at or adjacent the component is reduced or prevented.

Various examples of the disclosure have been described. These and other examples are within the scope of the following claims.

What is claimed is:

1. An accelerometer comprising:
a proof mass;
a housing enclosing the proof mass; and
a cold temperature sink defining a condensing surface configured to promote at least one of condensation or ice formation in an interior of the housing, wherein the condensing surface is spaced from the proof mass to divert at least one of condensate or ice away from the proof mass, and wherein the accelerometer is configured to generate a signal indicative of an acceleration based on displacement of the proof mass.

2. The accelerometer of claim 1, wherein the condensing surface is configured to retain the at least one of the condensate or the ice.

3. The accelerometer of claim 1, wherein the condensing surface comprises a first region of the housing having a first thermal conductivity that is greater than a second thermal conductivity of a second region of the housing, wherein the first region having the first thermal conductivity conducts heat away from the housing faster than the second region of the housing to promote the at least one of the condensation or the ice formation at the first region and retain the at least one of the condensate or the ice at the first region.

4. The accelerometer of claim 1, wherein the condensing surface comprises a region of the housing having a highest thermal conductivity within the housing to conduct away heat from the housing to promote the at least one of the condensation or the ice formation and retain the at least one of the condensate or the ice at the region.

5. The accelerometer of claim 1, further comprising a structure enclosed by the housing and adjacent the proof mass, wherein the condensing surface is configured to divert the at least one of the condensate or the ice away from a volume at least partially defined between the proof mass and the structure.

6. The accelerometer of claim 5, wherein the structure comprises one or more of a damping plate, an excitation ring, a stator, a magnetic assembly, a capacitance plate, a force-rebalance coil, a tuning fork, or circuitry.

7. The accelerometer of claim 1, wherein the proof mass comprises an in-plane proof mass or an out-of-plane proof mass.

8. The accelerometer of claim 1, further comprising a proof mass assembly comprising a proof support and the proof mass, wherein the proof mass is coupled to the proof support.

9. The accelerometer of claim 8, wherein the proof mass assembly is monolithic.

10. The accelerometer of claim 9, wherein the proof mass assembly comprises at least one of a piezoelectric material or a silicon-based material.

11. The accelerometer of claim 1, wherein the condensing surface defines at least one of a plurality of condensing features configured to promote the at least one of the condensation or the ice formation and retain at least one of the condensate or the ice.

12. The accelerometer of claim 11, wherein the plurality of condensing features comprises at least one of raised features, depressed features, grooves, channels, or interconnected pores.

13. The accelerometer of claim 1, wherein at least a portion of the plurality of condensing features defines a metal or alloy surface.

14. The accelerometer of claim 1, further comprising circuitry configured to generate the signal indicative of the acceleration based on the displacement of the proof mass.

15. A method for making an accelerometer, the method comprising:
forming a cold temperature sink defining a condensing surface, wherein the condensing surface is configured to promote at least one of condensation or ice formation in an interior of a housing of the accelerometer; and
enclosing a proof mass in the housing, wherein the condensing surface is spaced from the proof mass to divert at least one of condensate or ice away from the proof mass, and wherein the accelerometer is configured to generate a signal indicative of an acceleration based on displacement of the proof mass.

16. The method of claim 15, further comprising enclosing a structure in the housing and adjacent the proof mass, wherein the condensing surface is configured to divert the at least one of the condensate or the ice away from a volume at least partially defined between the proof mass and the structure.

17. The method of claim 15, further comprising forming at least one of a plurality of condensing features in the condensing surface, wherein the plurality of condensing features is configured to promote the at least one of the condensation or the ice formation and retain the at least one of the condensate or the ice, and wherein the plurality of condensing features comprises at least one of raised features, depressed features, isolated channels, or interconnected channels.

18. The method of claim 17, wherein forming the condensing surface comprises at least one of molding, stamping, machining, or additive manufacturing.

19. The method of claim 15, wherein the condensing surface is configured to retain the at least one of the condensate or the ice.

20. The method of claim 15, wherein the condensing surface comprises a region of the housing having a highest thermal conductivity within the housing to conduct away heat from the housing to promote the at least one of the condensation or the ice formation and retain the at least one of the condensate or the ice at the region.

* * * * *